(12) United States Patent
Martin et al.

(10) Patent No.: US 7,846,280 B2
(45) Date of Patent: Dec. 7, 2010

(54) ULTRASONIC WELDING MEMBER FOR SMOOTHING FLEXIBLE BELT SEAMS AND METHOD FOR USING

(75) Inventors: David W. Martin, Walworth, NY (US); David A. Dehollander, Fairport, NY (US); Jonathan H. Herko, Walworth, NY (US); Scott J. Griffin, Fairport, NY (US); Michael S. Roetker, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 128 days.

(21) Appl. No.: 12/269,794

(22) Filed: Nov. 12, 2008

(65) Prior Publication Data
US 2009/0294513 A1    Dec. 3, 2009

Related U.S. Application Data

(63) Continuation-in-part of application No. 12/128,054, filed on May 28, 2008.

(51) Int. Cl.
*B32B 37/00* (2006.01)

(52) U.S. Cl. .................. 156/73.4; 156/73.1; 156/157; 156/580.2

(58) Field of Classification Search ............. 156/73.1, 156/73.4, 137, 157, 304.1, 555, 580.1, 580.2, 156/581, 582
See application file for complete search history.

(56) References Cited

U.S. PATENT DOCUMENTS

| | | | |
|---|---|---|---|
| 4,532,166 A | 7/1985 | Thomsen et al. | |
| 4,786,570 A | 11/1988 | Yu et al. | |
| 4,937,117 A | 6/1990 | Yu | |
| 5,021,309 A | 6/1991 | Yu | |
| RE38,248 E * | 9/2003 | Yu et al. | 156/64 |
| 7,491,281 B2 * | 2/2009 | Darcy et al. | 156/73.3 |

* cited by examiner

*Primary Examiner*—James Sells
(74) *Attorney, Agent, or Firm*—Pillsbury Winthrop Shaw Pittman LLP

(57) ABSTRACT

An ultrasonic welding member for use in welding seamed flexible belts to produce smoother seams having reduced seam thickness. The ultrasonic welding member has a unique configuration, that includes an increased tip surface formed in such a manner that more energy from the horn is dispersed over the seam overlap region for a longer duration of time to produce a smoother and thinner weld.

14 Claims, 4 Drawing Sheets

ULTRASONIC WELDING MEMBER FOR SMOOTHING FLEXIBLE BELT SEAMS AND METHOD FOR USING

RELATED APPLICATIONS

The application is a Continuation-In-Part of U.S. application Ser. No. 12/128,054, filed May 28, 2008, which is expressly incorporated by reference.

BACKGROUND

The present embodiments relate generally to an ultrasonic welding member that is used to smooth flexible imaging member belts to produce a smooth seam with reduced thickness, and methods for using the same to produce seamed flexible belts. More specifically, embodiments relate to an ultrasonic horn with a unique configuration that allows efficient smoothing of the belt seam during transverse welding applications.

Electrophotographic printing is a well-known and commonly used method of copying or printing documents. Electrophotographic printing is performed by exposing a light image representation of a desired document onto a substantially uniformly charged photoreceptor. In response to that light image the photoreceptor discharges, creating an electrostatic latent image of the desired document on the photoreceptor's surface. Toner is then deposited onto that latent image, forming a toner image. The toner image is then transferred from the photoreceptor onto a receiving substrate such as a sheet of paper. The transferred toner image is then fused with the substrate, usually using heat and/or pressure. The surface of the photoreceptor is then cleaned of residual developing material and recharged in preparation for the production of another image.

The foregoing generally describes black and white electrophotographic printing machines. Electrophotographic printing can also produce color images by repeating the above process for each color of toner that is used to make the color image. For example, the photoreceptive surface may be exposed to a light image that represents a first color, say black. The resultant electrostatic latent image can then be developed with black toner particles to produce a black toner layer that is subsequently transferred onto a receiving substrate. The process can then be repeated or a second color, say yellow, then for a third color, say magenta, and finally for a fourth color, say cyan. When the toner layers are placed in superimposed registration the desired composite color toner image is formed and fused on the receiving substrate.

The color printing process described above superimposes the color toner layers directly onto a substrate. Other electrophotographic printing systems use intermediate transfer belts. In such systems successive toner layers are electrostatically transferred in superimposed registration from the photoreceptor onto an intermediate transfer belt. Only after the composite toner image is formed on the intermediate transfer belt is that image transferred and fused onto the substrate. Indeed, some electrophotographic printing systems use multiple intermediate transfer belts, transferring toner to and from belts as required to fulfill the requirements of the machine's overall architecture.

In operation, an intermediate transfer belt is brought into contact with a toner image-bearing member such as a photoreceptor belt. In the contact zone an electrostatic field generating device such as a corotron, a bias transfer roller, a bias blade, or the like creates electrostatic fields that transfer toner onto the intermediate transfer belt. Subsequently, the intermediate transfer belt is brought into contact with a receiver. A similar electrostatic field generating device then transfers toner from the intermediate transfer belt to the receiver. Depending on the system, a receiver can be another intermediate transfer member or a substrate onto which the toner will eventually be fixed. In either case the control of the electrostatic fields in and near the transfer zone is a significant factor in toner transfer.

Intermediate transfer belts often take the form of seamed belts fabricated by fastening two ends of a web material together, such as by welding, sewing, wiring, stapling, or gluing. While seamless intermediate transfer belts are possible, they require manufacturing processes that make them much more expensive than similar seamed intermediate transfer belts. This is particularly true when the intermediate transfer belt is long.

Seamed belts are fabricated from a sheet cut from an imaging member web. The sheets are generally rectangular or in the shape of a parallelogram where the seam does not form a right angle to the parallel sides of the sheet. All edges may be of the same length or one pair of parallel edges may be longer than the other pair of parallel edges. The sheets are formed into a belt by joining overlapping opposite marginal end regions of the sheet. A seam is typically produced in the overlapping marginal end regions at the point of joining. Joining may be effected by any suitable means. Typical joining techniques include welding (including ultrasonic), gluing, taping, pressure heat fusing, and the like. For example, puzzle-cut seams are disclosed in 1 U.S. Pat. Nos. 5,487,707, 6,318,223, and 6,440,515, which are hereby incorporated by reference in their entirety. A typical ultrasonic welding process is carried out by holding down the overlapped ends of a flexible imaging member sheet with vacuum against a flat anvil surface and guiding the flat end of an ultrasonic vibrating horn transversely across the width of the sheet, over and along the length of the overlapped ends, to form a welded seam.

Belts, sheets, films and the like are important to the xerographic process. Belt function is often significantly affected by the seam of the belt. For example, belts formed according to known butting or overlapping techniques provide a bump or other discontinuity in the belt surface leading to a height differential between adjacent portions of the belt, for example, of 0.010 inches or more depending on the belt thickness. This increased height differential leads to performance failure in many applications.

When ultrasonically welded into a belt, the seam of multilayered electrophotographic imaging flexible member belts may occasionally contain undesirable high protrusions such as peaks, ridges, spikes, and mounds. These seam protrusions present problems during image cycling of the belt machine because they interact with cleaning blades to cause blade wear and tear, which ultimately affect cleaning blade efficiency and service life.

A bump, surface irregularity, or other discontinuity in the seam of the belt may disturb the tuck of the cleaning blade as it makes intimate contact with the photoconductive member surface to effect residual toner and debris removal. The increased height differential may allow toner to pass under the cleaning blade and not be cleaned. Furthermore, seams having differential heights may, when subjected to repeated striking by cleaning blades, cause photoconductive member cycling speed disturbance which affects the crucial photoconductive belt motion quality. Moreover, seams with a bump or any morphological defects can cause the untransferred, residual toner to be trapped in the sites of seam surface irregularities. The seam of a photoreceptor belt which is repeatedly subjected to the striking action by a cleaning blade under machine functioning conditions has triggered the development of pre-mature seam delamination failure. In addition, the discontinuity in belt thickness due to the presence of an excessive seam height yields variances of mechanical strength in the belt as well as reducing the fatigue flex life of the seam when cycling over the belt module support rollers. As a result, both the cleaning life of the blade and the overall service life of the photoreceptor belt can be greatly diminished.

Moreover, the protrusion high spots in the seam may also interfere with the operation of subsystems of copiers, printers and duplicators by damaging electrode wires used in development subsystems that position the wires parallel to and closely spaced from the outer imaging surface of belt photoreceptors. These closely spaced wires are employed to facilitate the formation of a toner powder cloud at a development zone adjacent to a toner donor roll and the imaging surface of the belt imaging member.

In addition, the copy quality of image printout can be degraded. Such irregularities in seam height provide vibrational noise in xerographic development which disturb the toner image on the belt and degrade resolution and transfer of the toner image to the final copy sheet. This is particularly prevalent in those applications requiring the application of multiple color layers of liquid or dry developer on a photoreceptor belt, which are subsequently transferred to a final copy sheet. Further, the seam discontinuity or bump in such a belt may result in inaccurate image registration during development, inaccurate belt tracking and overall deterioration of motion quality, as a result of the translating vibrations.

As such, there is a need for seamed belts with improved seam surface topology to withstand greater dynamic fatigue conditions and tools and methods for achieving these seams. For example, an improved belt having a seam which provides a smoother surface with substantially decreased or eliminated profile protrusions or irregularity would extend service life.

SUMMARY

According to embodiments illustrated herein, there is provided an ultrasonic welding member for ultrasonically welding the seams of flexible belts to produce welded seams that have an improved surface topology and reduced thickness of its welded seam overlap, and methods for using the ultrasonic welding member for making such welded seams.

In particular, an embodiment provides an ultrasonic welding member for ultrasonically welding seamed flexible imaging member belts comprising a main body, a first contact surface defined at one end of the main body, the one end being raised from the main body, a second contact surface defined at the one end of the main body, the second contact surface immediately adjoining the first contact surface and gradually increasing in surface area as the second contact surface continues away from the first contact surface.

Embodiments also provide an ultrasonic horn for welding seamed flexible imaging member belts comprising a main body, a first contact surface defined at one end of the main body, the one end being raised from the main body, a second contact surface defined at the one end of the main body, the second contact surface immediately adjoining the first contact surface and gradually increasing in surface area as the second contact surface continues away from the first contact surface.

Further embodiments provide a method for making an ultrasonically welded seamed flexible imaging member belt comprising providing a sheet of electrophotographic imaging material to be joined at opposite edges of the sheet, overlapping the sheet at the opposite edges, positioning over the overlap an ultrasonic welding member for ultrasonically welding seamed flexible imaging member belts comprising a main body, a first contact surface defined at one end of the main body, the one end being raised from the main body, a second contact surface defined at the one end of the main body, the second contact surface immediately adjoining the first contact surface and gradually increasing in surface area as the second contact surface continues away from the first contact surface, applying the ultrasonic welding member to the overlap to focus heat and pressure on the overlap, and and moving the ultrasonic welding member along the overlap along a welding process direction to form a welded seam having reduced thickness while imbedding any splash into the welded seam.

BRIEF DESCRIPTION OF THE DRAWINGS

For a better understanding of the present embodiments, reference may be had to the accompanying figures.

DETAILED DESCRIPTION

In the following description, it is understood that other embodiments may be utilized and structural and operational changes may be made without departure from the scope of the present embodiments disclosed herein.

The present embodiments relate to an ultrasonic welding member for use in smoothing flexible belt seams to achieve ultrasonically welded seams having smoother surface topology and reduced seam thickness to greatly improve both the cleaning life of the cleaning blade and the overall service life of the flexible belt. More specifically, embodiments relate to an ultrasonic horn with a particular configuration that can be used in transverse welding application to produce smoother and thinner belt seams with longer service life.

Typical electrostatographic flexible belt imaging members include, for example, photoreceptors for electrophotographic imaging systems, electroreceptors such as ionographic imaging members for electrographic imaging systems, and intermediate image transfer belts for transferring toner images in electrophotographic and electrographic imaging systems. Those achieved with the present embodiments can be used with fuser belts, pressure belts, intermediate transfer belts, transfuse belts, transport belts, developer belts, photoreceptor belts, and the like. The seamed belts are prepared using the unique shape of the horn to form smoother seams with reduced thicknesses.

Figure 1:
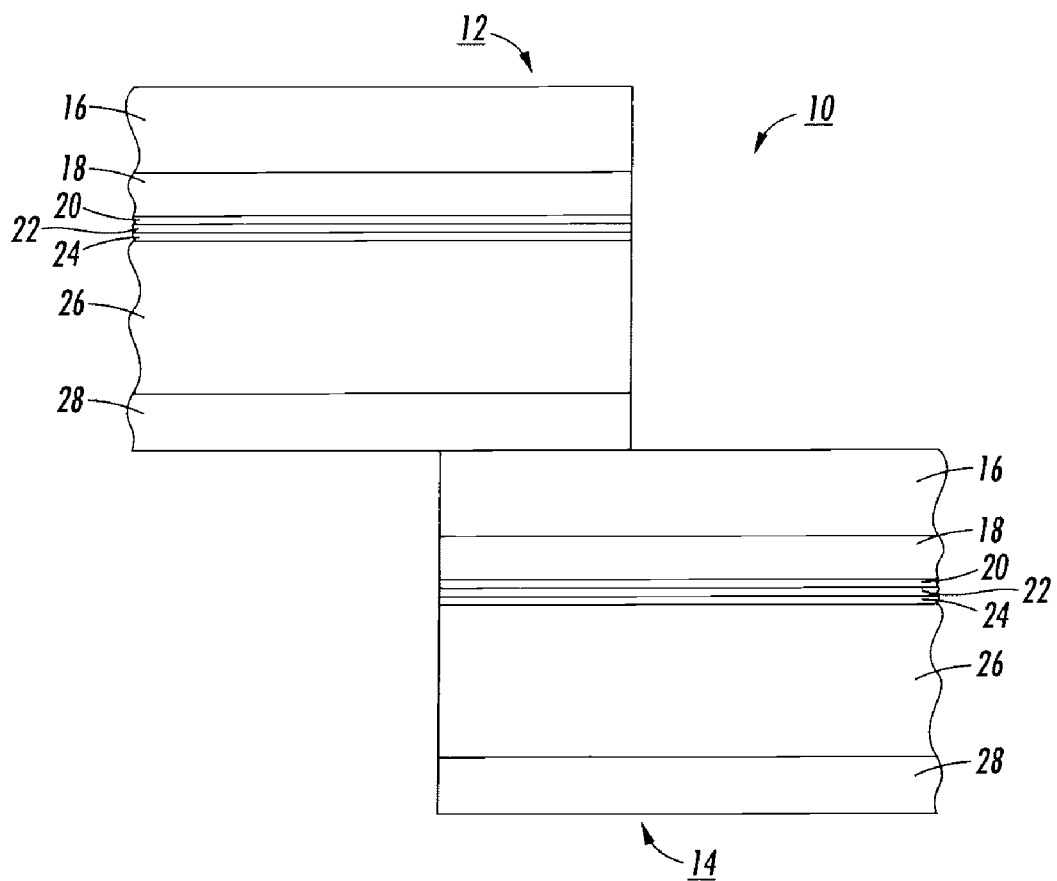
FIG. 1 is a cross-sectional view of a multilayered flexible sheet of imaging material with opposite ends overlapped.

Referring to FIG. 1, there is illustrated a flexible member 10 in the form of a sheet having a first end marginal region 12 overlapping a second end marginal region 14 to form an overlap region ready for a seam forming operation. The flexible member 10 can be utilized within an electrophotographic imaging device and may be a single film substrate member or a member having a film substrate layer combined with one or more additional coating layers. At least one of the coating layers comprises a film forming binder.

The flexible member 10 may be a single layer or comprise multiple layers. If the flexible member 10 is to be a negatively charged photoreceptor device, the flexible member 10 may comprise a charge generator layer sandwiched between a conductive surface and a charge transport layer. Alternatively, if the flexible member 10 is to be a positively charged photoreceptor device, the flexible member 10 may comprise a charge transport layer sandwiched between a conductive surface and a charge generator layer.

The layers of the flexible member 10 can comprise numerous suitable materials having suitable mechanical properties. Examples of typical layers are described in U.S. Pat. Nos. 4,786,570, 4,937,117 and 5,021,309, the entire disclosures thereof being incorporated herein by reference. The flexible member 10 shown in FIG. 1, including each end marginal region 13 and 14, comprises from top to bottom a charge transport layer 16 (e.g., 24 micrometers thick), a generator layer 18 (e.g., 1 micrometer thick), an interface layer 20 (e.g., 0.05 micrometer thick), a blocking layer 22 (e.g., 0.04 micrometer thick), a conductive ground plane layer 24 (e.g., 0.02 micrometer thick, a supporting layer 26 (e.g., 76.2 micrometer thick), and an anti-curl back coating layer 28 (e.g., 14 micrometer thick). It should be understood that the thickness of the layers are for purposes of illustration only and that a wide range of thicknesses can be used for each of the layers.

Figure 2:
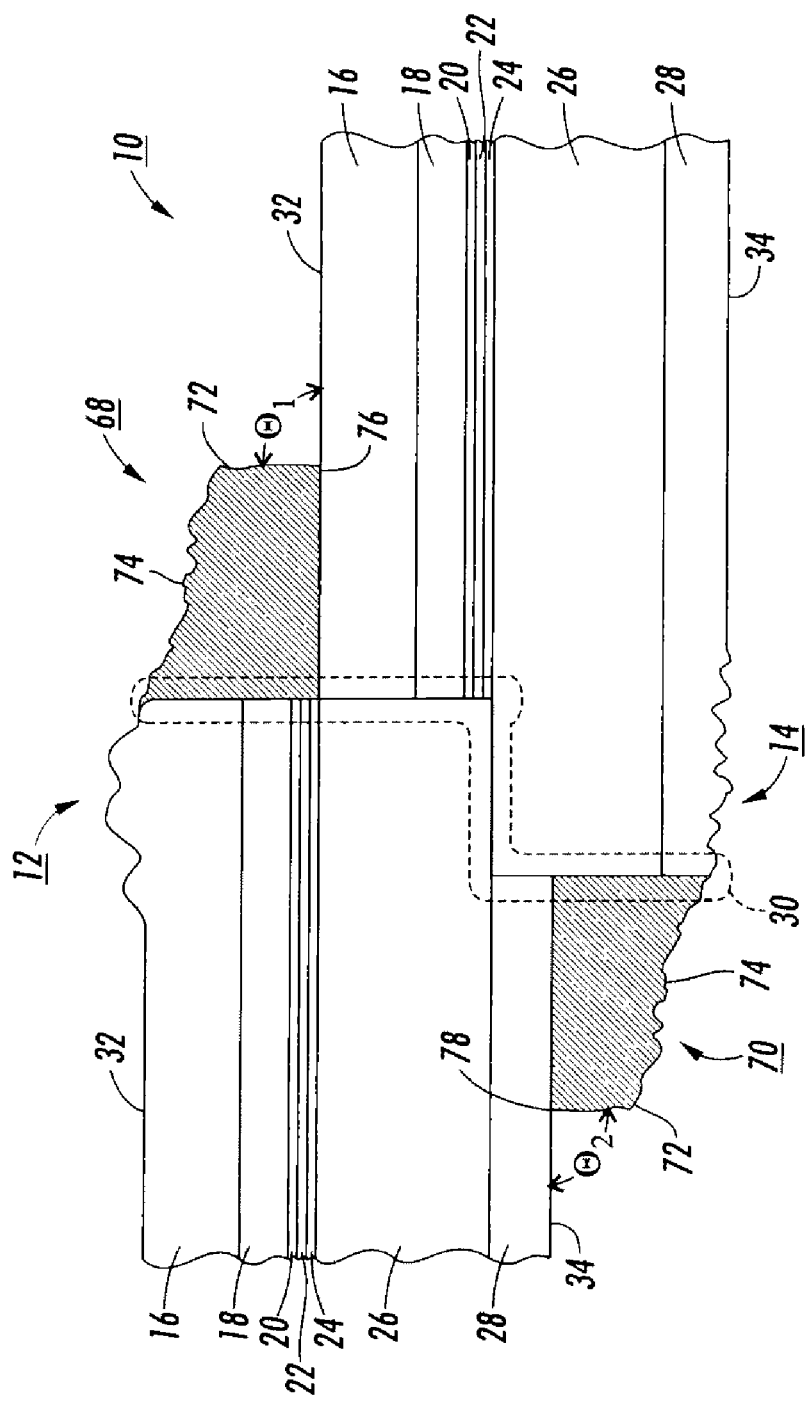
FIG. 2 is a cross-sectional view of a multilayered seamed belt derived from the sheet of FIG. 1 after ultrasonic seaming welding.

The end marginal regions 12 and 14 can be joined by any suitable means including gluing, taping, stapling, pressure and heat fusing to form a continuous member such as a belt, sleeve, or cylinder. Both heat and pressure can be used to bond the end marginal regions 12 and 14 into a seam 30 in the overlap region as illustrated in FIG. 2. The flexible member 10 is thus transformed from a sheet of electrophotographic imaging material as illustrated in FIG. 1 into a continuous electrophotographic imaging belt as illustrated in FIG. 2. The flexible member 10 has a first exterior major surface or side 32 and a second exterior major surface or side 34 on the opposite side. The seam 30 joins the flexible member 10 so that the bottom surface 34 (generally including at least one layer immediately above) at and/or near the first end marginal region 12 is integral with the top surface 32 (generally including at east one layer immediately below) at and/or near the second end marginal region 14.

A heat and pressure joining means includes ultrasonic welding to transform the sheet of photoconductive imaging material into a photoreceptor belt. The belt can be fabricated by ultrasonic welding of the overlapped opposite end regions of a sheet. In the ultrasonic seam welding process, ultrasonic energy applied to the overlap region is used to melt suitable layers such as the charge transport layer 16, generator layer 18, interface layer 20, blocking layer 22, part of the support layer 26 and/or anti-curl back coating layer 28. Direct fusing of the support layer achieves optimum seam strength.

Ultrasonic welding may be the method chosen for joining a flexible imaging member because it is rapid, clean and solvent-free and low cost, as well as because it produces a thin and narrow seam. In addition, ultrasonic welding may be used because the mechanical high frequency pounding of the welding horn causes generation of heat at the contiguous overlapping end marginal regions of the flexible imaging sheet loop to maximize melting of one or more layers therein to form a strong and precisely defined seam joint. The melting of the coating layers of the photoconductive sheet provides direct substrate to substrate contact of the opposite ends and fusing them into a seam. For example, ultrasonic welding and an apparatus for performing the same is disclosed in U.S. Pat. No. 4,532,166, which is hereby incorporated by reference.

Ultrasonic welding is a process that uses high frequency mechanical vibrations above the audible range. The vibrations are produced at the tip or end of a welding sonotrode or horn. The vibratory force emanating from such a horn device can be generated at high enough frequencies to soften or melt thermoplastic material components intended to be joined together. For example, such frequencies can be effective at 20, 30 or 40 kHz. One of the main advantages of ultrasonic welding may be found in the very short welding steps that enhance its usefulness even in mass production. Weld times may last less than a second.

Seam formation in belt products has been carried out using ultrasonic welding for many years. Application of the sonic energy to the photoreceptor edge is conducted through an ultrasonic horn and thus is a function of the horn design Various horn configurations have been used and the convention configurations have a ridged profile. The problem with these conventional members, however, is that they produce high profile (or thick) welds and encrusted deposits (or splash) along the seam. In addition, the welded seams exhibit low seam strength. Recent investigations into the intermediate transfer belts (ITB) business show that the industry requires an almost seamless belt to avoid cleaning blade damage and image quality problems due to streaking and other disruption of subsystems, such as image acoustic transfer assist devices, during the electro photographic imaging belt process.

The present embodiments, employ a unique tip to an ultrasonic welding member which have been used to produce much desired properties in the welded seams and to avoid the above-mentioned problems. More particularly, the present embodiments provide an ultrasonic welding member which has a unique configuration that includes an increased tip surface formed in such a manner that more energy from the improved member is dispersed over the seam overlap region for a longer duration of time to produce a smoother and thinner seam weld.

By increasing the welding tip surface of the ultrasonic welding member, the finished seams of the welds are able to be made thinner and with almost no encrusted deposits due to the concentration of energy from the ultrasonic welding member over the seam for a longer duration of time. In addition, the larger member surface enables belt material to be dispersed into the seam area instead of the margins of the seam. By creating different tip configurations that employ the larger surface area, the inventors were able to product belts appearing almost seamless.

Aluminum ultrasonic horns using 20-75 KHz power supply units have been shown produce smooth seam qualities when used with the present embodiments. The present embodiments modify the tip of a standard ultrasonic horn tip configuration to concentrate the ultrasonic energy into a larger area on a reduced seam overlap, approximately 100-400 μm, of weldable material. By utilizing a larger area on the horn surface, the horn stays in contact longer with the material and therefore disperses the energy of the horn over the seam for a longer duration of time, resulting in a thinner weld profile. The thinner weld profile is accomplished by exposing the material overlap to a smaller lead on the tip which is followed by a gradually increasing welding tip surface. The larger surface imbeds the splash into the smaller overlap seam. By staying engaged with the material for a longer duration of time the weld thickness, normally 96-130 μm, is reduced significantly. Moreover, no additional sanding or smoothing step needs to be taken after forming the welded seam with the ultrasonic welding member. As such, no material needs to be removed from the welded seam, leading to a welded seam that is much stronger than conventionally formed welded seams.

Figure 3A:
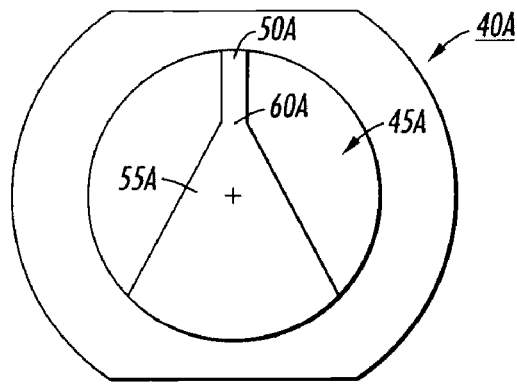
FIG. 3A is a front view of a first horn tip in accordance with the present embodiments.
Figure 3B:
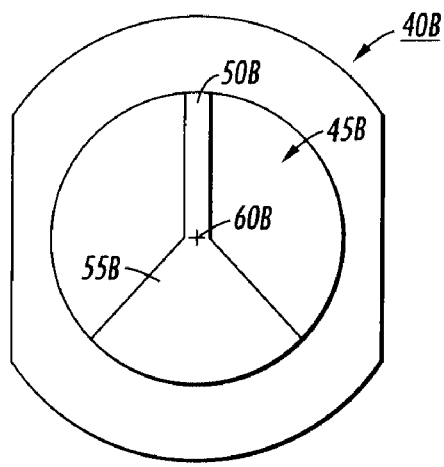
FIG. 3B is a front view of a second horn tip in accordance with the present embodiments.
Figure 3C:
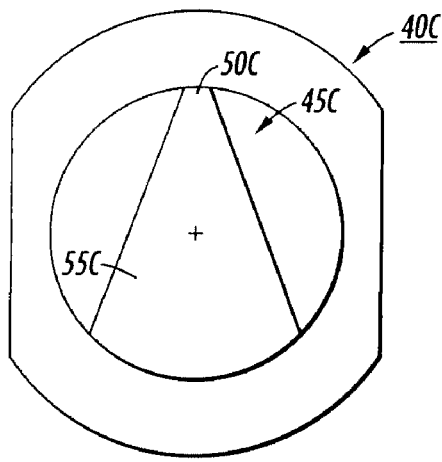
FIG. 3C is a front view of a third horn tip in accordance with the present embodiments.
Figure 4A:
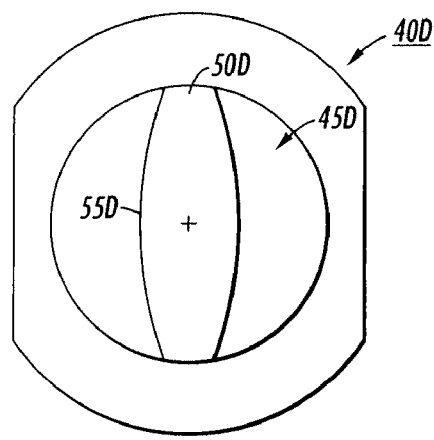
FIG. 4A is a front view of a fourth horn tip in accordance with the present embodiments.
Figure 4B:
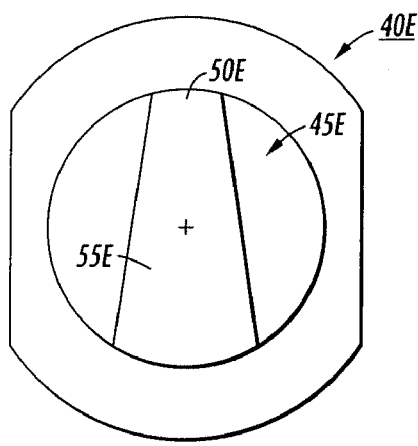
FIG. 4B is a front view of a fifth horn tip in accordance with the present embodiments.
Figure 4C:
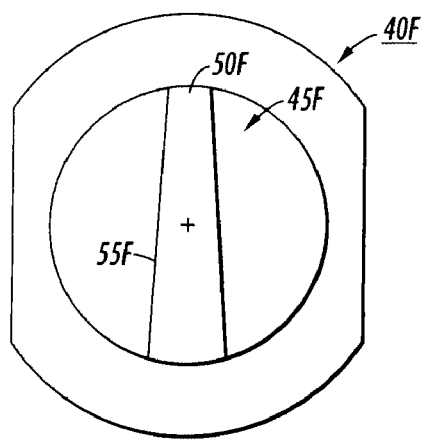
FIG. 4C is a front view of a sixth horn tip in accordance with the present embodiments.

Referring to FIGS. 3A and 3B, there are illustrated front views of the tip of an ultrasonic horn 40A, 40B in accordance with the present embodiments. The main body (not shown) of the horn 40A, 40B has one end that is raised from the main body. The horn 40A, 40B is formed such that a first contact surface 50A, 50B is defined at the raised end 45A, 45B of the main body, and a second contact surface 55A, 55B is also defined at the raised end 45A, 45B of the main body, wherein the second contact surface 55A, 55B immediately adjoins the first contact surface 50A, 50B and gradually increases in surface area as the second contact surface 55A, 55B extends away from the first contact surface 50A, 50B. The first contact surface 50A, 50B serves as a lead surface to which the weldable material is exposed. As the ultrasonic horn 40A, 40B continues along the overlap seam, the weldable material is further exposed to the gradually increasing second contact surface 55A, 55B which concentrates the energy for a longer duration of time to the overlap seam. In this manner, as the ultrasonic horn proceeds along the overlap seam in a welding process direction, the second contact surface 55A, 55B imbeds the splash into the smaller overlap seam and provides a welded seam that is smoother with much thinner profile. In FIG. 3A, the first contact surface 50A, 50B maintains a constant width until it reaches a point 60A, 60B from which the second contact surface 55A, 55B begins to gradually increase in surface area. In particular embodiments, the second contact surface is V-shaped.

In FIGS. 3C, 4A, 4B and 4C, there are illustrated front views of the tip of an ultrasonic horn 40C, 40D, 40E, 40F in accordance with further embodiments. In these embodiments, the horn 40C, 40D, 40E, 40F is formed such that a raised end 45C, 45D, 45E, 45F of the horn 40C, 40D, 40E, 40F begins with a first contact surface 50C, 50D, 50E, 50F which is immediately adjoined and followed by a second contact surface 55A, 55B, which has a gradually increasing surface area. The first contact surface 50C, 50D, 50E, 50F serves as a lead surface to which the weldable material is exposed. As the ultrasonic horn 40C, 40D, 40E, 40F continues along the overlap seam, the weldable material is further exposed to the gradually increasing second contact surface 55C, 55D, 55E, 55F which concentrates the energy for a longer duration of time to the overlap seam. In this manner, as the ultrasonic horn proceeds along the overlap seam, the second contact surface 55C, 55D, 55E, 55F imbeds the splash into the smaller overlap seam and provides a welded seam that is smoother with much thinner profile. In these embodiments, the first contact surface 50C, 50D, 50E, 50F does not maintain a constant width and the horn 40C, 40D, 40E, 40F does not need to include a point as the embodiments shown in FIGS. 3A and 3B. Rather, the first contact surface 50C, 50D, 50E, 50F itself exhibits a small increase in surface area, and transitions into the second contact surface 55C, 55D, 55E, 55F, which further continues the gradual increase in surface area.

In specific embodiments, the above-described ultrasonic welding members are composed of aluminum. The overall length of the welding surface on the tip may be from about 3 mm to about 13 mm. The first contact surface of the ultrasonic welding member may have a length of from about 0.5 mm to about 10 mm, and in embodiments where the first contact surface has a constant width, a width of from about 0.5 mm to about 8 mm. In further embodiments, the second contact surface may have a length of from about 1 mm to about 12 mm, and a surface area of from about 100 $mm^2$ to about 130 $mm^2$.

In embodiments, there is also provided a method for using the ultrasonic welding member to achieve a smoother and thinner seamed flexible belt. In embodiments, the method comprises ultrasonically welding together overlapping sheets of electrophotographic imaging material with the ultrasonic welding member. More particularly, the method comprises providing a sheet of electrophotographic imaging material to be joined at opposite edges of the sheet, overlapping the sheet at the opposite edges, positioning over the overlap the ultrasonic welding member for ultrasonically welding seamed flexible imaging member belts. By applying the ultrasonic welding member to the overlap, heat and pressure can be focused along the overlap. The ultrasonic welding member is moved along the overlap along a welding process direction to form a welded seam having reduced thickness while imbedding any splash into the welded seam.

As stated above, the ultrasonic welding member includes a first contact surface and a second contact surface, wherein the second contact surface has a gradually increasing surface. The modification of a conventional member to include a larger surface area helps concentrate the ultrasonic energy into a larger area on a reduced seam overlap of weldable material. By utilizing a larger area on the ultrasonic welding member surface, the method allows the ultrasonic welding member to stay in contact longer with the material and therefore disperses the energy over the seam for a longer duration of time, resulting in a thinner weld profile. The thinner weld profile is accomplished by exposing the material over lap to a smaller, first contact surface of the imaging member which leads the welding process to form a seam with a reduced profile, and is followed by further exposing the formed overlap seam to the gradually increasing surface of the second contact surface to imbed the splash into the overlap seam. By staying engaged with the material for a longer duration of time the weld is much smoother and its thickness reduced significantly. In particular embodiments, the ultrasonic welding member is an ultrasonic horn.

The present embodiments also include ultrasonically welded seamed flexible belts formed by the processes described above. The resulting belts have improved seam surface topology and can withstand greater dynamic fatigue conditions. In addition, the present embodiments may be automated such that the processes can be run more efficiently and consistently to form the desired smooth seamed flexible belts.

The embodiments may be used to produce a flexible belt selected from the group consisting of a photoreceptor, an electroreceptor, and an intermediate image transfer belt. The flexible belt may consist of a single layer of substantially homogeneous material or may comprise at least two different layers having different compositions or properties. The present embodiments may be used on other welded seams, puzzle-cut seams and taped seams and are applicable across all machine platforms whether xerographic systems utilizing tandem or belt designs. The embodiments may also be applied to seams in various seamed belt members, such as for example, a photoreceptor, an electroreceptor, an intermediate image transfer belt, and the like.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

All the patents and applications referred to herein are hereby specifically, and totally incorporated herein by reference in their entirety in the instant specification.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A method for making an ultrasonically welded seamed flexible imaging member belt comprising:
   providing a sheet of electrophotographic imaging material to be joined at opposite edges of the sheet;
   overlapping the sheet at the opposite edges;
   positioning over the overlap an ultrasonic welding member for ultrasonically welding seamed flexible imaging member belts comprising
      a main body;
      a first contact surface defined at one end of the main body, the one end being raised from the main body;
      a second contact surface defined at the one end of the main body, the second contact surface immediately adjoining the first contact surface and gradually increasing in surface area as the second contact surface continues away from the first contact surface:
   applying the ultrasonic welding member to the overlap to focus heat and pressure on the overlap; and
   moving the ultrasonic welding member along the overlap along a welding process direction to form a welded seam having reduced thickness while imbedding any splash into the welded seam.

2. The method of claim 1 being adapted to produce a smooth welded seam without removing electrophotographic imaging material such that seam strength is maintained.

3. The method of claim 1, wherein the ultrasonic welding member is an ultrasonic horn, 4. The method of claim 1, wherein the ultrasonic welding member is composed of aluminum.

5. The method of claim 1, wherein the splash is embedded into the welded seam by application of the second face.

6. The method of claim 1, wherein the ultrasonic welding member focuses heat and pressure to from about 100 microns to about 400 microns of the overlap.

7. The method of claim 1, wherein the second contact surface has a surface area of from about 100 mm$^2$ to about 130 mm$^2$.

8. The method of claim 1, wherein the second contact surface is V-shaped.

9. The method of claim 1, wherein the second contact surface has a larger surface area than the first contact surface.

10. The method of claim 1, wherein the first contact surface has a constant width.

11. The method of claim 10, wherein the width is from about 0.5 mm to about 8 mm.

12. The method of claim 10, wherein the first contact surface has a length of from about 0.5 mm to about 10 mm.

13. The method of claim 1, wherein the first contact surface has gradually increasing surface area.

14. The method of claim 1, wherein the second contact surface has a length of from about 1 mm to about 12 mm.

* * * * *